US006973567B1

(12) United States Patent
Riley et al.

(10) Patent No.: US 6,973,567 B1
(45) Date of Patent: Dec. 6, 2005

(54) EARLY AUTHENTICATION DURING MODEM TRAINING

(75) Inventors: Kevin Riley, Tyngsboro, MA (US); Alex Urquizo, Burlington, MA (US)

(73) Assignee: Cisco Technology, Inc., San Jose, CA (US)

( * ) Notice: Subject to any disclaimer, the term of this patent is extended or adjusted under 35 U.S.C. 154(b) by 792 days.

(21) Appl. No.: 09/952,830

(22) Filed: Sep. 14, 2001

(51) Int. Cl.[7] .............................................. H04L 9/00
(52) U.S. Cl. ...................... 713/151; 713/152; 713/155; 713/164; 713/168
(58) Field of Search ................................ 713/151, 202

(56) References Cited

U.S. PATENT DOCUMENTS

| | | | | |
|---|---|---|---|---|
| 5,146,472 | A | | 9/1992 | Hallman .......................... 375/8 |
| 5,751,796 | A | | 5/1998 | Scott et al. ............... 379/93.31 |
| 6,061,795 | A | * | 5/2000 | Dircks et al. ................ 713/201 |
| 6,065,120 | A | * | 5/2000 | Laursen et al. .............. 713/201 |
| 6,212,247 | B1 | | 4/2001 | Olafsson ...................... 375/358 |
| 6,219,790 | B1 | * | 4/2001 | Lloyd et al. ................. 713/201 |
| 6,598,167 | B2 | * | 7/2003 | Devine et al. ............... 713/201 |
| 6,606,744 | B1 | * | 8/2003 | Mikurak ....................... 717/174 |
| 6,615,258 | B1 | * | 9/2003 | Barry et al. ................. 709/223 |
| 6,615,264 | B1 | * | 9/2003 | Stoltz et al. ................. 709/227 |
| 6,714,979 | B1 | * | 3/2004 | Brandt et al. ............... 709/225 |

FOREIGN PATENT DOCUMENTS

| | | |
|---|---|---|
| WO | WO 97/49228 | 12/1997 |
| WO | WO 98/33314 | 7/1998 |
| WO | WO 99/31813 | 6/1999 |
| WO | WO 00/03512 | 1/2000 |

OTHER PUBLICATIONS

Olafsson, S., "A Method for Early Data 38," *Telecommunications Industry Association (TIA)*, Wilmington, DE Apr. 3, 2001-May 4, 2001 (7 pp.).
"ACN—RB Bay DSP Modem Version 56 Release Notes," http:www.umanitoba.ca/campus/acn/remote/relnotes/r9.html, downloaded Jul. 11, 2001.

* cited by examiner

*Primary Examiner*—Kambiz Zand
(74) *Attorney, Agent, or Firm*—Hamilton, Brook, Smith & Reynods, P.C.

(57) ABSTRACT

Early authentication processing uses the manufacture defined ("MD") sequence made available by communication protocols during the Layer 1 training stage of a communications connection process to initiate an authentication request signal. Initiation of an authentication request during the training stage of a communications connection process is accomplished by packaging authentication request information into an authentication request signal and sending the authentication request signal, during the manufacturer defined sequence portion of Layer 1 training, to a communications connection receiver process. The authentication request information typically comprises a username and a password than can be used to verify the identify of the requester. Additionally, processing of an authentication request during the a communications connection process is provided. The processing comprises receiving an authentication request signal, during the manufacturer defined sequence portion of Layer 1 training, from a communications connection sender process and initiating authentication based upon the authentication request signal. Acknowledgment signals can be sent between the initiator and receiver such that each can be assured that the other received the appropriate information.

16 Claims, 6 Drawing Sheets

FIG. 6

EARLY AUTHENTICATION DURING MODEM TRAINING

BACKGROUND OF THE INVENTION

This invention relates generally to authenticating users during a communications connection process, and more specifically to initiating an early authentication request during the training stage of a communications connection process.

Authentication is the process by which a user's access to a system is validated. Typically a user offers proof of their right to access a system by presenting various credentials, such as a valid user-identification ("userid") and password. The system can compare the offered userid and password to an authorized list of valid userids and passwords in order to validate the user's access request. Authentication is a process that is often offloaded to a separate processor within a system. The separate processor often provides authentication, authorization, and accounting ("AAA"). An exemplary AAA server is Cisco Systems' RADIUS server, which can be used with a variety of AAA security protocols, such as TACACS+, Kerberos, or local username lookup.

Users access systems requiring authentication using components connected to a communications network via data communications equipment ("DCE"). One common DCE type is a modem, a modem modulates a computer's digital signals onto a continuous carrier frequency through a communications line. These communications lines can be ordinary telephone lines (POTS), DSL or cable lines. Upon receiving a continuous carrier frequency signal the modem demodulates the signal into a digital form that the computer can understand, thereby allowing digital computers to communicate over analog lines.

Modems consist of two major components: a datapump that performs the basic modulation/demodulation tasks for which modems are named and a controller that provides the modem's identity. The protocols for hardware error correction and hardware data compression operate in the controller. The controller is also responsible for interpreting attention (i.e., "AT") commands. The basic modulation protocols (such as V.92, V.90 and V.34) operate in the datapump. There are several different types of modems: a traditional modem implements both a datapump and a controller in the hardware as chips inside the modem. A controller-less modem, such as the Winmodem, has a hardware datapump, but implements the controller function as software. A host signal processor ("HSP") modem uses software to provide the datapump and controller functions. HSP modems transfer the work normally done by the missing chips to software running on the host computer's main processor (e.g., Pentium, PowerPC). Software-based modems use fewer chips as compared to traditional modems.

All modem types require a training stage to be completed in order to fully establish a communications link capable of session to session communications. In modems that implement the V.34, V.90 and V.92 protocols the training stage is accomplished during the startup procedures defined in the four phases of Open Systems Interconnect ("OSI") Layer 1. When Layer 1 training is complete full-duplex communications is established. Currently user access/authorization requests are initiated only after the Layer 1 training stage is complete (i.e., in Layer 2 or higher).

SUMMARY OF THE INVENTION

Waiting until the Layer 1 training phase is complete before initiating an access authorization request results in delays in establishing the data communications session. These delays can be significant to an end-user attempting to connect to a network via a modem. Thus, an effective technique for reducing the delay caused by user access authentication is required. Accordingly, the present invention initiates an early authentication request using the manufacture defined ("MD") sequence made available by communications protocols (e.g., V.34, V.90, V.92) used during the Layer 1 training stage of a communications connection process.

The present invention provides a method for initiating an authentication request during the training stage of a communications connection process by packaging authentication request information into an authentication request signal and sending the authentication request signal, during the manufacturer defined sequence portion of Layer 1 training, to a communications connection receiver process. The authentication request information comprises a username (userid) and a password than can be used to verify the identify of the requestor.

Additionally, a method for improving the efficiency of processing an authentication request during a communications connection process is disclosed, comprising the steps of receiving an authentication request signal, during the manufacturer defined sequence portion of Layer 1 training, from a communications connection sender process and initiating authentication based upon the authentication request signal. Acknowledgment signals can be sent between the initiator and receiver such that each can be assured that the other received the appropriate information.

By initiating an access/authorization request early in the training stage of a communications connection process precious time can be saved. Depending upon the modem standard used, the savings can be anywhere from 5 to 15 seconds (e.g., V.90 and V.92 modems can save on the order of 10 to 15 seconds in total connect time).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
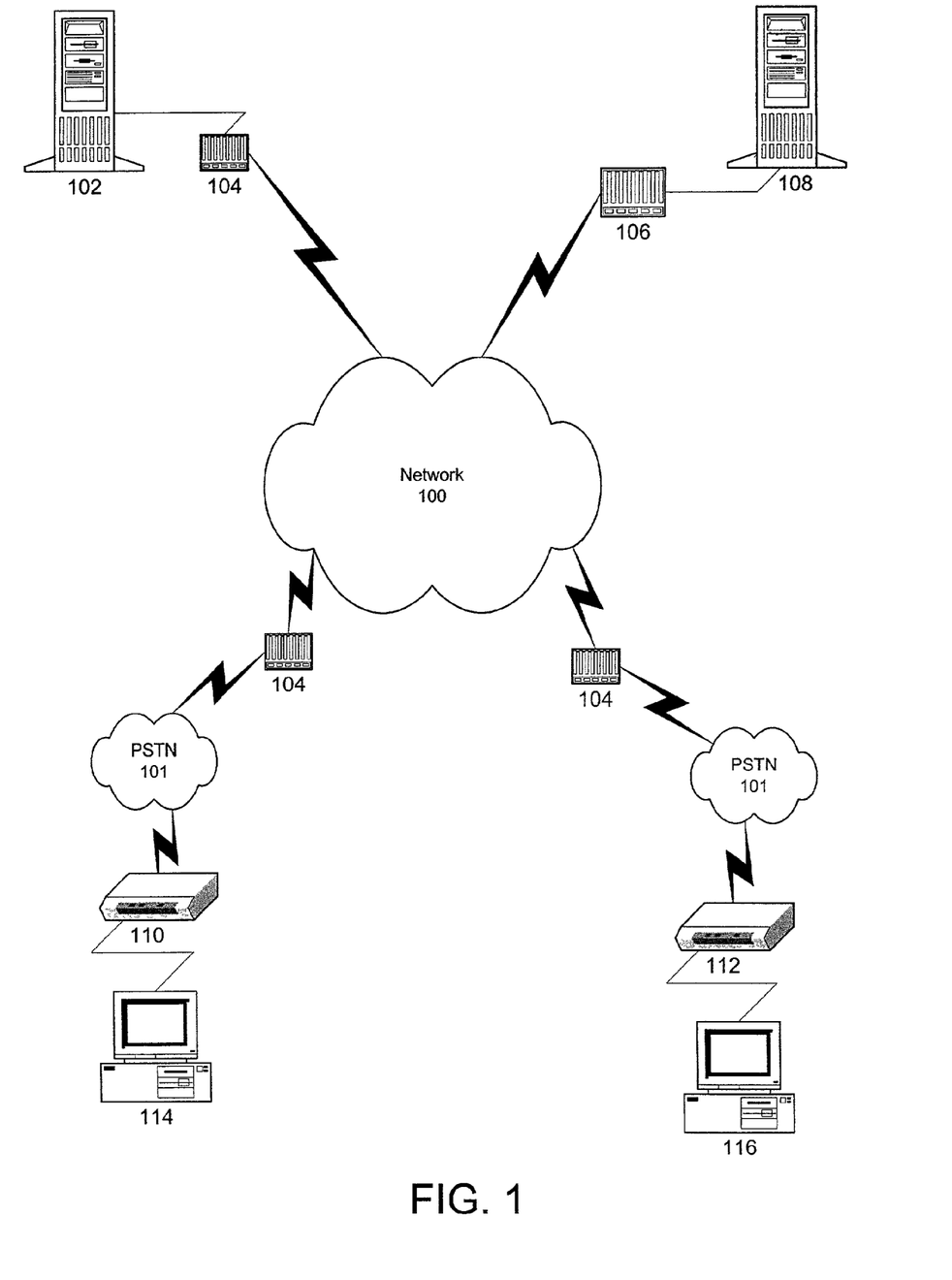
FIG. 1 illustrates a data communications system on which an embodiment of the present invention is implemented.

FIG. 1 illustrates a data communications system on which an embodiment of the present invention is implemented. Network 100 connects various DCEs, such as modem 110, 112 and remote access servers ("RAS") 104. Remote access server 104 provides access to network 100 connecting DCEs and general-purpose network server 102 (e.g., Web server, database server, ISP server, etc.). DCE 106 provides access to AAA server 108. Modem 110, 112 connect end-user computers 114, 116 to Public Switched Telephone Network 101 having access to an edge router (e.g., RAS 104) connected to network 100.

In one typical communications connection scenario a user of end-user computer 114 desires to initiate a connection to network (Web) server 102. The user loads and executes a data communications program (e.g., America Online V6.0) on end-user computer 114 which interacts with modem 110. Modem 110 starts the training process of establishing a connection with remote access server 104. During the process of establishing the connection remote access server 104 may interact with AAA server 108 to authenticate rights based upon userid/password information that is sent by the end-user. In the present invention this authentication information is sent from modem 110 to RAS 104 during the manufacturer defined (MD) sequence that is part of the modem training protocol used to establish the communications connection, thus allowing for the authentication process to begin earlier than in conventional communication connection systems.

Figure 2:
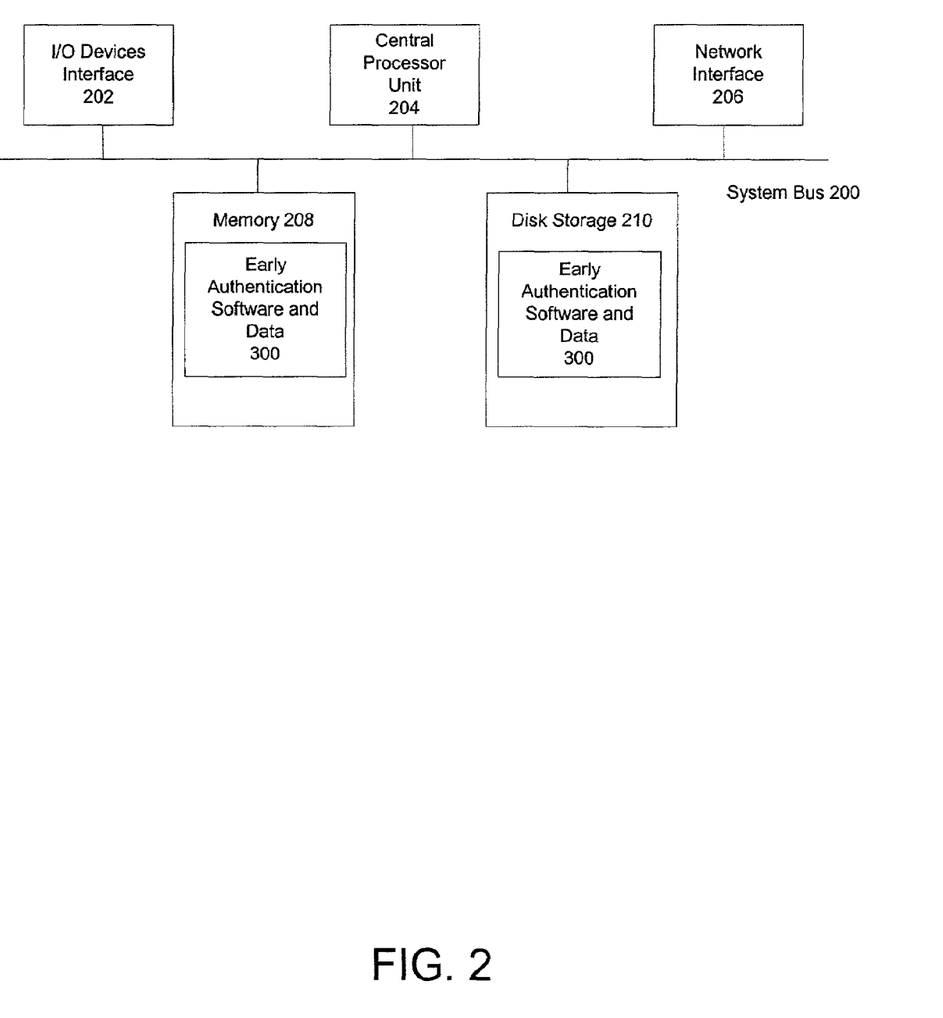
FIG. 2 is a diagram of the internal structure of a DCE connected to the data communications system of FIG. 1 configured according to an embodiment of the present invention.

FIG. 2 is a diagram of the internal structure of a DCE configured according to an embodiment of the present invention. Modem 110, 112, remote access server 104 and DCE 106 contain a system bus 200; a bus is a set of hardware lines used for data transfer among the components in the data communications system. A bus is essentially a shared channel that connects different components of the data communications system (e.g., I/O devices, processors, network interfaces, disk storage and memory) and enables the different components to transfer information. Attached to system bus 200 is I/O devices interface 202, which allows input and output devices, such as video displays, keyboards, pointing devices and the like to communicate with other components on system bus 200. A processor, such as processor 204, executes instructions and accesses data stored in memory 208. Network interface 206 provides a link to an external network, for example network 100, thus allowing DCE (e.g., modem 110, 112, remote access server 104 and DCE 106) to communicate with each other. Memory 208 stores computer software instructions and data structures used to implement an embodiment of the present invention (e.g., early authentication software and data 300). Disk storage 210 provides non-volatile storage for DCEs on network 100 to store instructions and data, for example, early authentication software and data 300. The combination of components connected to system bus 200 provide for initiating, receiving and processing an authentication request during the training stage of a communications connection process.

Early authentication software and data 300 provide instructions and data that provide a method for initiating an authentication request during the training stage of a communications connection process by packaging authentication request information into an authentication request signal and sending the authentication request signal, during the manufacturer defined sequence portion of Layer 1 training, to a communications connection receiver process. The authentication request information comprises a username and a password than can be used to verify the identify of the requestor.

This early presentation of authentication data (i.e., during the MD sequence of Layer 1 training) allows the receiving process to initiate authentication processing earlier than is conventionally done. Conventionally, authentication processing is initiated only after Layer 1 training is complete. Early authentication initiation can save significant time, as authentication is a time-intensive process often requiring interaction with a separate (e.g., AAA) network server.

Figure 3:
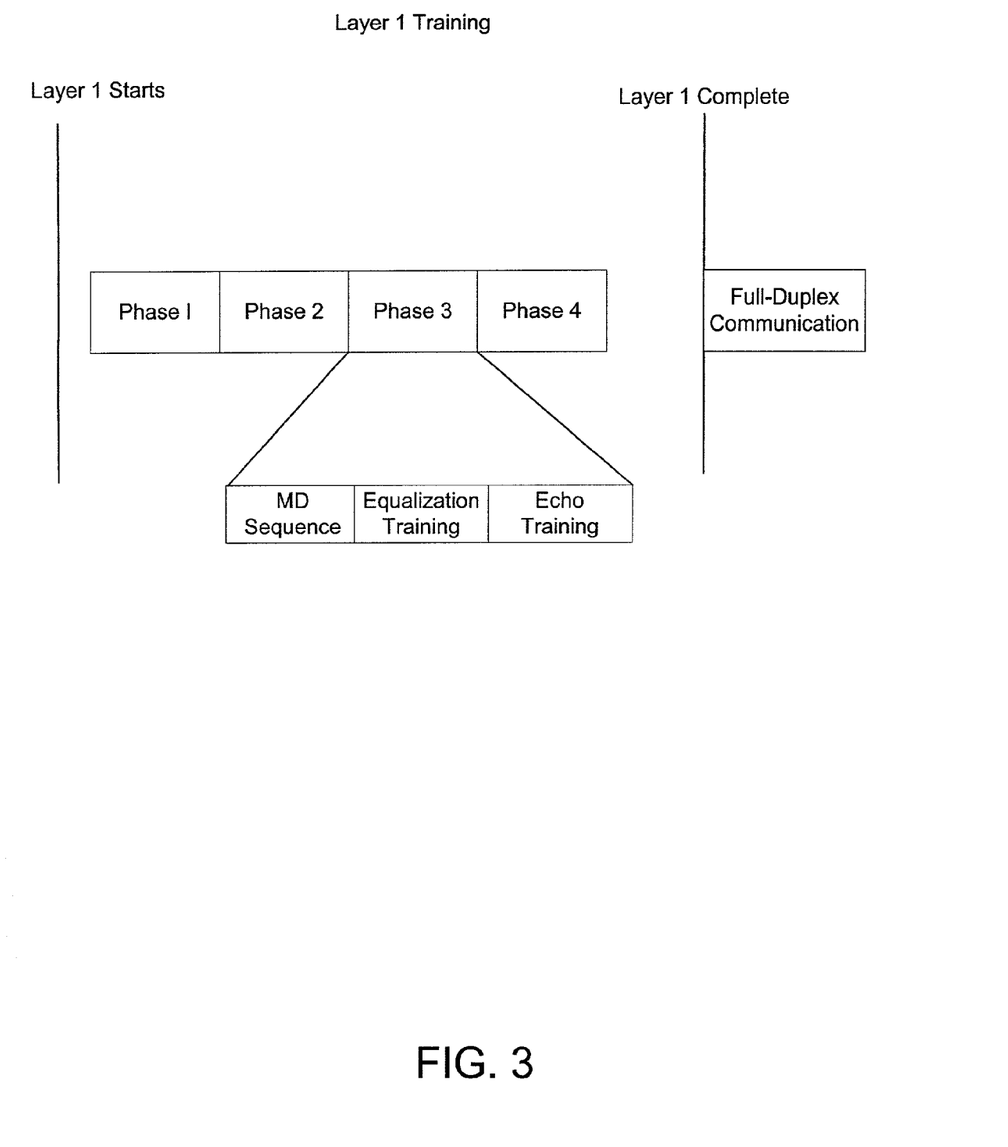
FIG. 3 illustrates the four phases of Layer 1 training as utilized by an embodiment of the present invention.

FIG. 3 illustrates the four phases of OSI Layer 1 training as utilized by an embodiment of the present invention. OSI Layer 1, the physical layer, describes the physical properties of the various communications media, as well as the electrical properties and interpretation of the exchanged signals. For example this layer defines cable types, connector types, termination methods and training procedures. The training procedure comprises four phases. Phase 1 training, network interaction, determines which protocol modes each call modem and receive modem support. In Phase 1 the call modem conditions its receiver to detect either signal ANS or ANSam as defined in ITU recommendation V.8. In Phase 2 training channel probing and ranging are performed as part of the start-up procedure. Phase 3 provides equalizer and echo canceller training, it is in Phase 3 that the MD sequence is defined. In the present invention the MD sequence will be used to send an authentication request signal to the receive modem in order to initiate early authentication of the call modem user. Phase four is the final training phase and consists of fine tuning and rate selection. Phase four completes Layer 1 training and provides the basis for full-duplex communications in Layer 2 and above.

Alternate uses of the MD sequence signal include extended echo canceller training that is not covered by the TRN signal in Phase 3. When another use of the MD sequence is defined, the present invention simply concatenates information on to the existing signal to communicate its authentication request.

Figure 4:
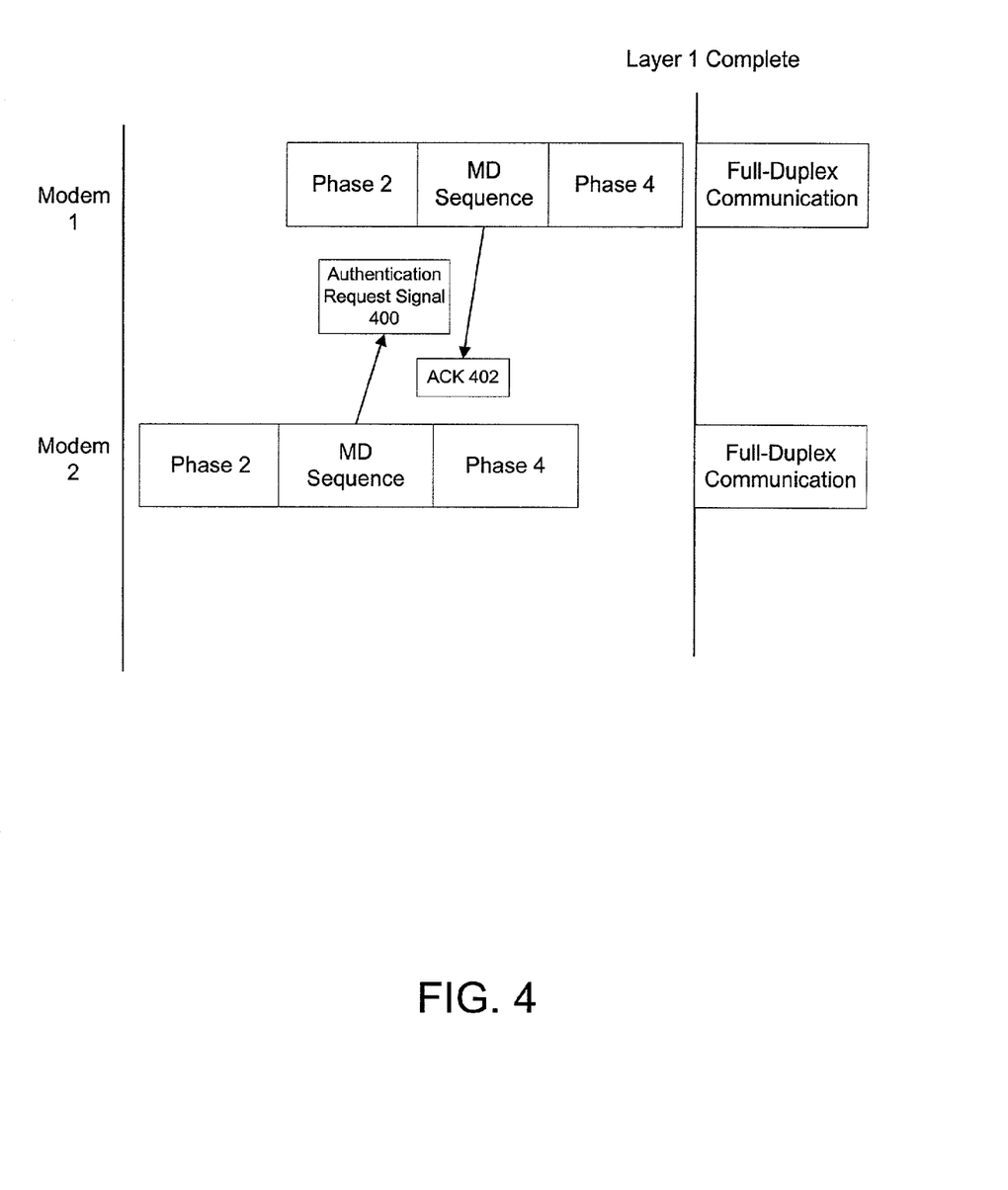
FIG. 4 illustrates the authentication signals employed during the manufacture defined sequence of Layer 1 training as configured according to an embodiment of the present invention.

FIG. 4 illustrates the authentication signals employed during the manufacturer defined (MD) sequence of Layer 1 training as configured according to an embodiment of the present invention. The authentication request signal 400 comprises information used to authenticate access by an end-user to a particular server resource. This information typically includes a user identification (userId) and password, although other identification information may be used consistent the teaching of the present invention.

The maximum length of the MD sequence is 4.445 seconds, this time can be used to provide reliable transport of the authentication request signal 400. The length of the MD sequence is typically communicated in Phase 2 of Layer 1 modem training. Even if an error correction protocol has not yet been established, reliable communication can be achieved based upon the low-bitrate modulation supported during phase 3 training, as well as by sending the authentication signal (e.g., userId/password) as a repeating sequence. Additionally, a Cyclic Redundancy Check ("CRC") can be used to further insure reliable transport of the authentication signal.

Once the receive modem receives the authentication request signal 400 containing the authentication request information it can forward the authentication request on to an authentication process. In one embodiment the authentication process is a AAA server (e.g., Cisco Systems RADIUS server), the AAA server is configured to authorize or reject authentication requests. Typically authentication is checked in Layer 3 as part of PPP processing. Using the MD sequence to initiate the authentication request prior to the Layer 3 processing allows for a much quicker response to the PPP authentication check because at least part of the authentication process has been proceeding in parallel (e.g., on a AAA server) with the modem training. Parallel processing reduces the overall time required to authenticate end-users during the communications connection process.

In certain systems using protocols that support modem MD sequence processing an acknowledgement that the authentication request signal 400 was properly received can be sent as an acknowledgement ("ACK") signal, for example ACK 402. For example, a modem running in V.34 server-originate mode can acknowledge with an acknowledge signal (e.g., ACK 402) sent from the server modem to the call modem. The use of an ACK 402 signal can reassure the client modem that the MD sequence signal was successfully received (or decoded) and that there is no need to do this part of authentication the Layer 1 signal exchange has been completed.

Alternately, the un-used bit fields on signals sent by the server modem after receipt of the MD signal can be used to acknowledge successful receipt of the authentication request signal. In one preferred embodiment a zero-bit ("0") indicates that the MD sequence signal was not received, and a one-bit ("1") indicates that the MD sequence signal was successfully received.

In one example, end-user A uses end-user computer 114 in an attempt to access their Internet Service Provider (e.g., America Online) running on Web Server 102. End-user A launches a software application with communications capabilities (e.g., America Online V6.0) which activates a modem driver configured according to the present invention to connect to modem 110 through the use of the Early Authentication Software and Data 300. The software application with communications capabilities prompts end-user A for a userId and password. The userId and password are passed to the modem driver and eventually to the Early Authentication Software program which uses the userId and password to package authentication request information into an authentication request signal 400 and send the authentication request signal 400 during the manufacturer defined sequence portion of Layer 1 training. The Early Authentication Software can wait for an ACK 402, if so configured, or can continue based on a predefined timeout.

The receiver modem uses a version of the Early Authentication Software running on the receiver modem (e.g., Remote Access Server 104) to acquire the authentication request information. The authentication request information can then be processed locally by Remote Access Server 104 or connected general-purpose network server 102. Alternately, the authentication request information can be sent over network 100 to AAA server 108 for authentication processing.

While the call modem and receive modem are negotiating various protocols, authentication processing is occurring in parallel. When the call modem and receive modem have completed Layer 1 and Layer 2 negotiations, and standard authentication processing starts, much, if not all, of the authentication processing will have been complete based on the early authentication initiated using the MD sequence.

Figure 5:
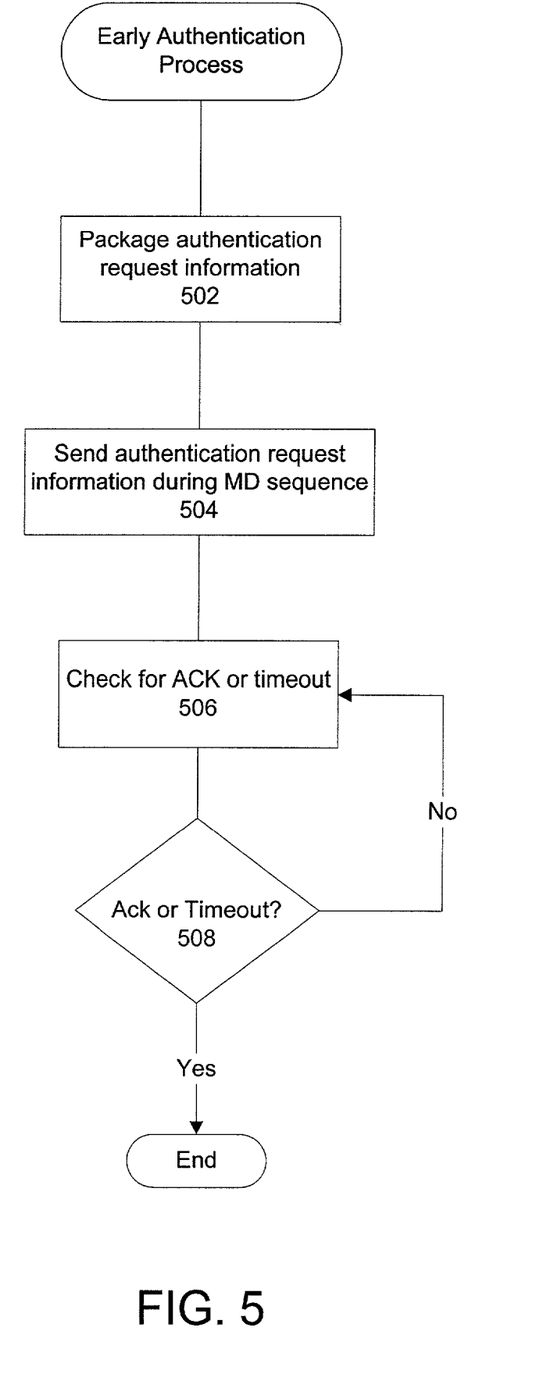
FIG. 5 is a flowchart of a method for initiating an authentication request during the training stage of a communications connection process configured according to an embodiment of the present invention.

FIG. 5 is a flowchart of a method for initiating an authentication request during the training stage of a communications connection process configured according to an embodiment of the present invention. The early authentication process begins at Step 502 where authentication request information is packaged into an authentication request signal. Authentication request information typically includes userId and password information. At step 504 the authentication request signal is sent to a communications connection receiver process during the manufacturer defined sequence portion of Layer 1 training. A check is made at Step 506 for either an ACK (if supported in the current protocol) or for a timeout. The results of the check are evaluated at Step 508, if neither an ACK nor a timeout occurred processing resumes at Step 506, otherwise the process ends. Standard processing of authentication requests occurs at Layer 2 and beyond, whether of not the authentication requested was initiated early using the MD sequence signal.

Figure 6:
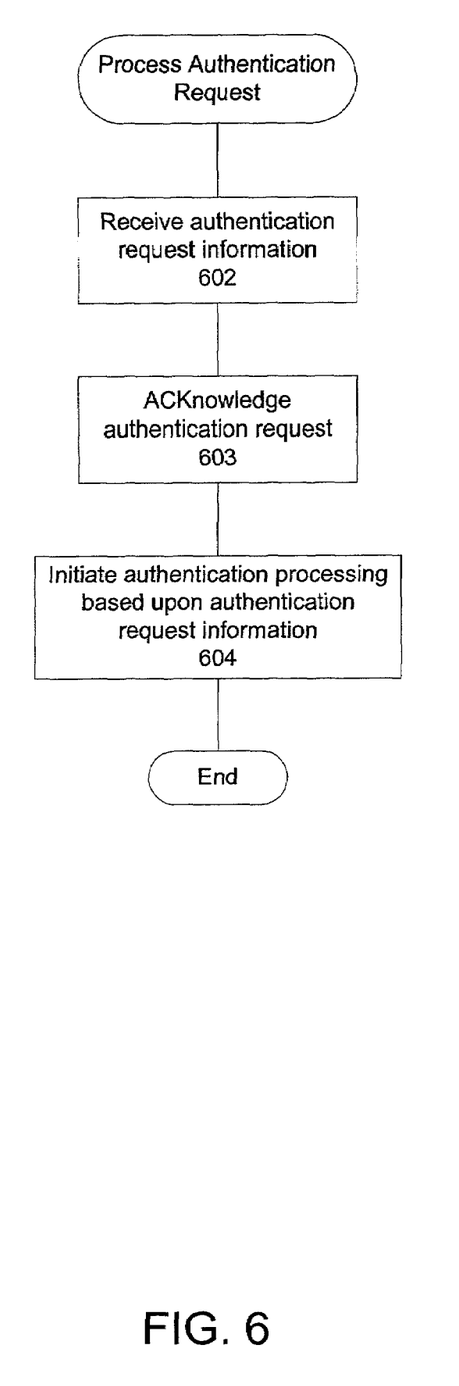
FIG. 6 is a flowchart of a method of receiving and processing an authentication request configured according to an embodiment of the present invention.

FIG. 6 is a flowchart of a method of receiving and processing an authentication request configured according to an embodiment of the present invention. At Step 602 An authentication request signal is received from a communications connection sender process during the manufacturer defined sequence portion of Layer 1 training. When communication protocols that support acknowledgement (e.g., V.34 server-originate mode) an acknowledgement signal (ACK) is sent at Step 603. Then authentication based upon the authentication request signal is initiated at Step 604.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for initiating an authentication request during a training stage of a communications establishment connection process between first and second data communication equipments (DCEs), comprising the steps of:
   packaging authentication request information into an authentication request signal; and
   sending the authentication request signal from the first DCE, during the training stage at a physical layer, to a communications connection receiver process at the second DCE.

2. The method of claim 1 wherein the authentication request information comprises a username and a password.

3. The method of claim 1 further comprising
   receiving, from a communications connection receiver, an acknowledgment that the authentication request signal was successfully received.

4. A method for improving a efficiency of processing an authentication request during a communications connection establishment process between first and second data communications equipments (DCEs), comprising the steps of:
   receiving an authentication request signal, during the training stage at the physical layer, from a communications connection sender process at the first DCE; and
   initiating authentication based upon the authentication request signal at the second DCE.

5. The method of claim 4 wherein the authentication request signal comprises authentication request information comprising a username and a password.

6. The method of claim 4 further comprising
   sending a communications connection sender an acknowledgment that the authentication request signal was successfully received.

7. An apparatus for initiating an authentication request during a training stage of a communications connection establishment process between first and second data communications equipments (DCEs), comprising:
   a packager packaging authentication request information into an authentication request signal; and a sender sending the authentication request signal from the first DCE, during the training stage at a physical layer, to a communications connection receiver process at the second DCE.

8. The apparatus of claim 7 wherein the authentication request information comprises a username and a password.

9. The apparatus of claim 7 further comprising
a receiver receiving, from a communications connection receiver, an acknowledgment that the authentication request signal was successfully received.

10. An apparatus for improving the efficiency of processing an authentication request during a communications connection establishment process between first and second data communications equipments (DCEs), comprising:
 a receiver receiving an authentication request signal, during a training stage at a physical layer, from a communications connection sender process at the first DCE; and
 an initiator initiating authentication based upon the authentication request signal at the second DCE.

11. The apparatus of claim 10 wherein the authentication request signal comprises authentication request information comprising a username and a password.

12. The apparatus of claim 10 further comprising
a sender sending a communications connection sender an acknowledgment that the authentication request signal was successfully received.

13. An apparatus for initiating an authentication request during a training stage of a communications connection establishment process between first and second data communications equipments (DCEs), comprising:
 means for packaging authentication request information into an authentication request signal; and
 means for sending the authentication request signal from the first DCE, during a training stage at the physical layer, to a communications connection receiver process at the second DCE.

14. An apparatus for improving the efficiency of processing an authentication request during a communications connection establishment process between first and second data communications equipments (DCEs), comprising:
 means for receiving an authentication request signal, during a training stage at the physical layer, from a communications connection sender process at the first DCE; and
 means for initiating authentication based upon the authentication request signal at the second DCE.

15. A computer program product comprising:
 a computer usable medium for initiating an authentication request during a training stage of a communications connection establishment process between first and second data communications equipments (DCEs);
 a set of computer program instructions embodied on the computer usable medium, including instructions to:
  package authentication request information into an authentication request signal; and
  send the authentication request signal from the first DCE, during the training stage at a physical layer, to a communications connection receiver process at the second DCE.

16. A computer program product comprising:
 a computer usable medium for improving an efficiency of processing an authentication request during a communications connection establishment process between first and second data communications equipments (DCEs);
 a set of computer program instructions embodied on the computer usable medium, including instructions to:
  receive an authentication request signal, during a training stage at a physical layer, from a communications connection sender process at the first DCE; and
  initiate authentication based upon the authentication request signal at the second DCE.

* * * * *